United States Patent [19]

Smith et al.

[11] Patent Number: 5,407,972
[45] Date of Patent: Apr. 18, 1995

[54] PHOTOCURABLE ETHYLENICALLY UNSATURATED SULFIDE AND POLYSULFIDE POLYMER COMPOSITIONS

[75] Inventors: W. Novis Smith, Philadelphia, Pa.; Mark Livesay, El Cajon, Calif.

[73] Assignee: Sunrez Corp., El Cajon, Calif.

[21] Appl. No.: 100,775

[22] Filed: Aug. 2, 1993

[51] Int. Cl.$^6$ ............... C08G 63/16; C08G 63/688; C08G 75/14; C08F 2/50
[52] U.S. Cl. ........................... 522/96; 522/107; 522/104; 522/33; 522/60; 522/64; 528/293; 528/294
[58] Field of Search ............... 522/104, 179, 180, 27, 522/17, 54, 55, 904, 107, 93, 96, 33, 60, 64; 528/294, 293

[56] References Cited

U.S. PATENT DOCUMENTS

| | | | |
|---|---|---|---|
| 2,673,151 | 3/1954 | Gerhart | 522/57 |
| 3,063,971 | 11/1962 | Stuart et al. | 528/294 |
| 3,362,936 | 1/1968 | Girard | 528/294 |
| 4,304,841 | 12/1981 | Horn et al. | 522/27 |
| 5,047,442 | 9/1991 | Sasaki et al. | 522/27 |

*Primary Examiner*—Susan W. Berman
*Attorney, Agent, or Firm*—John Lezdey

[57] ABSTRACT

A photocurable composition comprising the reaction products of hydroxy terminated liquid sulfide or polysulfide oligomers with photocurable ethylenically unsaturated compounds. The products provide improved sealants for air and marine vehicles.

17 Claims, No Drawings

PHOTOCURABLE ETHYLENICALLY UNSATURATED SULFIDE AND POLYSULFIDE POLYMER COMPOSITIONS

FIELD OF THE INVENTION

The present invention relates to radiation curable liquid sulfide and polysulfide polymers modified with unsaturated carboxylic acids or anhydrides for preparing adhesives, sealants and coatings. More particularly, the invention relates to modified sulfide and polysulfide polymer compositions which can be curable with UVa and sunlight with shorter curing rates to provide tough and elastic rubbery compounds.

DESCRIPTION OF THE PRIOR ART

Polysulfide or polythiol polymers are reaction products of alkali sulfide and alkylene dihalides or alkylene epoxide. The halides ordinarily used are ethylene dichloride, di(chloroethyl)-$\beta$, $\beta$ ether and dichloroethyl formate. Ethylene oxide also may be employed. In the commercial preparation of the polymer, the dihalide is added to an aqueous solution of sulfur in sodium hydroxide which can be isolated as a latex. The products formed are condensation polymers of the formula:

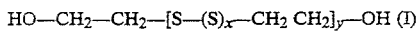

$\text{HO—CH}_2\text{—CH}_2\text{—[S—(S)}_x\text{—CH}_2\text{ CH}_2\text{]}_y\text{—OH}$ (I)

where X=0 or 1 and y=1 to 100,

The liquid polysulfide polymers can be cured to solid elastomeric products by oxidative coupling of the (—SH) groups to disulfides (—S—S—) groups at room temperature to tough solvent-resistant rubbers. Oxidizing agents such as inorganic and organic peroxides or metal oxides, e.g. zinc oxide, effect the curing reaction. The cured polysulfide elastomers have excellent oil and solvent resistance characteristics along with outstanding resistance to gas impermeability. The cured polysulfide polymers also provide good resistance to aging and ozone.

The liquid polysulfide elastomers are known in the sealant coating and adhesives field. Those liquid compounds are widely used as petroleum product tank sealants, caulking compounds and in various aircraft and marine applications.

A limitation of commercial liquid polysulfide polymer sealants and coatings is that curing rates at room temperatures require long periods of about 24 to 48 hours. Hence, the curing performance of liquid polysulfide polymers, adhesives, coatings and sealants is variable, difficult to predict and control. This obviously slows fabrication procedures and increases production costs.

U.S. Pat. No. 3,729,404 discloses photocurable polyene/polythiol compositions to which certain phosphines are added as activators. The addition of phosphines produces an appreciable increase in the reaction rate. Curing with UVa and sunlight is not described.

It has now been found that numerous defects of the prior art may be effectively overcome by the practice of the present invention which provides a new photocurable liquid polysulfide composition that upon exposure to radiation cures much faster than the unmodified polysulfide.

SUMMARY OF THE INVENTION

The present invention relates to photocurable compositions comprising the reaction products of hydroxy terminated liquid sulfide or polysulfide oligomers with photocurable ethylenically unsaturated compounds.

More specifically, there is provided a photocurable modified sulfide or polysulfide polymer which is the reaction product of a hydroxy terminated sulfide or polysulfide oligomer having the formula:

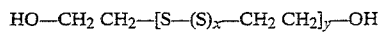

$\text{HO—CH}_2\text{ CH}_2\text{—[S—(S)}_x\text{—CH}_2\text{ CH}_2\text{]}_y\text{—OH}$ wherein X=0 to 1 and y=1 to 100 and having a molecular weight from 122 to 8000, with a photocurable ethylenically unsaturated compound in stoichiometric ratios from about 0.3 to 1.1 per hydroxyl group.

These modified liquid compositions may be cured by conventional oxidizing or peroxide curing agents but preferably are cured with actinic radiation which is normally emitted from the sun or from artificial sources. Ultraviolet radiation may be used most efficiently if the photocurable composition contains a suitable photoinitiator, e.g. bisphenyl (2,5-dimethybenzoyl) phosphine oxide.

Curing periods are comparatively very short, i.e. 1 to 5 minutes. The short curing periods are consistent with small curing operations such as in applications where thin films are required, as well as, with more massive layers such as with elastomeric sealants.

DETAILED DESCRIPTION OF THE INVENTION

In accordance with the present invention, it has been unexpectedly and surprisingly discovered that liquid hydroxy terminated polysulfide polymers can be reacted with acrylic or methacrylic acid or anhydride or $\alpha, \beta$- olefinically unsaturated dicarboxylic acid or anhydride or mixtures thereof to produce liquid mono- and-/or dimethacrylate or acrylate terminated sulfide or polysulfide monomers and oligomers whereupon by the addition of a photoiniating amount of a photoinitiator and exposure to a source of radiation, particularly to sunlight, and more particularly to ultraviolet light (360 mm to 410 mm), are curable at room temperature in a short period to produce a tough elastic rubbery composition useful as adhesives, sealants, and coatings. Alternatively, the liquid modified polymers may be cured with peroxide catalysts or a combination of peroxide and radiation.

The term "cure" is used herein to describe the process steps which result in a crosslinking reaction in a polymer whereby chains of the polymer become attached to each other by chemical bonds on exposure to a source of radiation or peroxide.

The process of the present invention produces monomers, oligomers, and cured modified sulfide and polysulfide polymers having both excellent rubber-like properties, and which are excellent in adhesion characteristics.

Liquid sulfide or polysulfide polymers having terminal hydroxy groups of the formula:

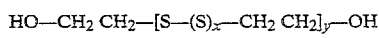

$\text{HO—CH}_2\text{ CH}_2\text{—[S—(S)}_x\text{—CH}_2\text{ CH}_2\text{]}_y\text{—OH}$ where X=0 or 1 and y=1 to 100 and having a molecular weight of 1000 to 8000 are reacted with, for example, methacrylic anhydride in stoichiometric molar ratios of 0.3 to 1.1 at temperatures from about 70° F. to about 240° F. Other related sulfides and polysulfides containing terminal hydroxy or mercapto groups can also be used. Preferably, the reaction should not exceed the upper temperature limit to avoid further polymerization. Blends of various molecular weight liquid sulfides and polysulfides can be used. Depending on the reaction temperature, esterification reaction times may vary from 1 to 12 hours. The mono and/or dimethacrylate modified sulfide and polysulfide monomers, oligomers and polymers remain in curable liquid polymer form. When carrying out the esterification of the hydroxy terminated polysulfide polymer, a polymerization inhibitor may be utilized. Examples of the inhibitors are p-methoxyphenol, hydroquinone, phenothiazine and nitrobenzene. The inhibitors can be added to the reaction mixture in the range of about 50–1000 parts per million (ppm) preferably about 100–400 ppm per 100 parts of final product (ester).

Prior to curing, the curable liquid polymer may be formulated for use as 100% solids dissolved or dispersed in organic solvents, or as dispersions or emulsions in aqueous media.

The curable liquid monomer or oligomer compositions prior to curing may readily be pumped, poured, siphoned, brushed, sprayed, doctored or otherwise handled as desired. Following application, curing in place to a solid resin or elastomer may be effected either very rapidly or extremely slowly as desired by manipulation of the compounding ingredients and the method of curing.

The liquid monomer or oligomer compositions prior to curing may be admixed with other monomeric and polymeric materials such as thermoplastic resins, elastomers or thermosetting resins monomeric or polymeric compositions. The resulting blend may be subjected to conditions for curing or re-curing of the various components of the blend to give cured products having unusual physical properties.

Although the mechanism of the curing reaction is not completely understood, it appears most likely that the curing reaction may be initiated by UVa light or radical generating agents which dissociate and generate a propagating radical. Generally, the rate of the peroxide curing reaction may be increased by raising the temperature of the composition at the time of initiation of cure. However, in many applications the curing is accomplished conveniently and economically by operating at ambient room conditions. The light cure reactions can be performed at about 0° F. to 200° F.

The radiation sources used according this invention to generate free radicals which initiate the curing reaction and emit light in the absorption region of photoinitiator compounds, i.e. from 230 mm to 450 mm. Sunlight, low pressure, medium pressure and high pressure mercury lamps are particularly suitable, superactinic fluorescent tubes or pulse lamps are particularly suitable. These lamps may or may not be doped.

In the photocuring process any conventional photoinitiators or mixtures thereof can be employed. Examples of the photoinitiators include acylphosphine oxides, aliphatic or aromatic ketones or aromatic aldehydes which have triplet energy in the range of from about 54–72 kilocalories per mole which promote the curing reaction.

The acylphosphine oxides are disclosed in the aforementioned U.S. Pat. No. 4,265,723 and consists of compounds of the formula:

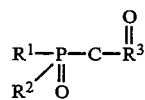

where $R^1$ is straight-chain or branched alkyl of 1 to 6 carbon atoms cyclohexyl, cyclopentyl, aryl which is unsubstituted or substituted by halogen, alkyl or alkoxy, or a S-containing or N-containing five-membered or six-membered heterocyclic radical, $R^2$ has one of the meanings of $R^1$ (but $R^1$ and $R^2$ may be identical or different) or is an alkoxy of 2 to 6 carbon atoms, aryloxy or araloxy, or $R^1$ and $R^2$ together form a ring, and $R^3$ is straight-chain or branched alkyl of 2 to 18 carbon atoms, a cycloaliphatic radical of 2 to 10 carbon atoms, phenyl, naphthyl or a S, O, or N containing five-membered or six membered heterocyclic radical and may contain additional substituents, or is the group where $R^1$ and $R^2$ have the above meanings and X is phenylene or aliphatic or cycloalipatic divalent radical of 2 to 6 carbon atoms, and one or more of the radicals $R^1$ to $R^3$ may be olefinically unsaturated.

The aliphatic and aromatic phosphates which may be utilized are disclosed in the U.S. Pat. No. 4,116, 788. Examples for the phosphites to be used as activators according to the invention are listed as follows: dimethylphosphite, dioctyl-phosphite, diphenylphosphite, tri (i-octyl) phosphite, tristearyl phosphite, trimethylphosphite, triethyl-phosphite, tri (i-propyl)phosphate, tris(allyl)phosphite, didecyl-phenyl-phosphite, tris(4-nonphenyl)phosphite, and tris-4 chlorophenyl-phosphite.

The photosensitizers which have a triplet energy in the range from about 54 to 72 kilocalories per mole which may be utilized are disclosed in U.S. Pat. No. 4,017,652 and include benzil, 3,4-benzofluorene, 4-naphthaldehyde, 1-acetylnaphthalene, 2,3-butanedione, 1-benzoylnaphthalene, 9-acetylphenanthrene, 3-acetylphenanthrene, 2-napthaldehyde, 2-benzoylnaphthalene, 4-phenylacetophenone, anthraquinone, thioxanthone, 3,4-methylenedioxyacetophenone, 4-cyanobenzophenone, 4-benzoylpyridine, 2-benzoylpridine, 4,4-dichlorobenzophenone, 4-trifluoromethylbenzophenone, 3-chlorobenzophenone, 4-methoxybenzophenone, 3,4-dimethylbenzophenone, 4-methylbenzophenone, benzophenone, 2-methylbenzophenone, 4- 4'-dimethylphenone, 2,5-dimethylbenzophenone, and 2,4-dimethylbenzophenone. Many of the photoinitiators which may be used in the present invention fall within the formula.

Although the focus of the present invention is directed to providing photopolymerizable compositions which are curable with visible light at room temperature with surprisingly short curing times, chemical free radical generating reagants are operable in this invention. Examples of chemical free radical generating agents include: oxygen; ozone; chlorine; organic peroxides and hydroperoxides; peracids; persulfates; inorganic peroxides; and oxo compounds. Certain of these compounds may be made more effective if used in conjunction with co-agent curing rate accelerators. Examples of accelerated systems may include benzoyl peroxide with ultraviolet light as an accelerator; benzoyl peroxide with dimethylaniline as an accelerator; cumene hydroperoxide with dimethylaniline as an accelerator; and the like. Included in this class are reagants or components which are generated in situ in the composition. Curing periods may be varied but the reactions are generally relatively fast. Conversions from liquid to solid state may occur within a few minutes.

The chemical free radical generating agent is usually added in an amount of the photocurable composition with the preferred range being from about 0.05 to about 5% by weight.

Conventional curing inhibitors or retarders which may be used in order to stabilize the components or curable compositions to prevent premature onset of curing may include hydroquinone; p-tertiary butyl catechol; 2,6-ditertiary butyl-p-methylphenol; phenothiazine; N-phenyl-2- naphthylamine.

The compositions to be cured, i.e. (converted to solid resin or elastomers) in accord with the present invention may, if desired include additives or antioxidants, accelerators, dye inhibitors, activators, fillers, pigments, antistatic agents, surfaceactive agents, viscosity modifiers, extending oils, plasticizers, tackifiers, thickeners and the like in an amount not to impair the purpose of this invention. In the case where photocuring by irradiation with ultraviolet rays or visible light rays is used, it is necessary that the curable composition remains transparent or translucent to visible light rays.

Suitable inorganic fillers include calcium carbonate, magnesium carbonate, barium sulfate, gypsum, aluminum trihydrate (aluminum hydroxide), clay, talc, mica, Koalin, silica powder, fumed silica, glass fiber powders, (milled fibers), calcium silicate, hydrotalcite, colemanite, alum, titanium dioxide, bentonite, silica magnesium hydroxide, dolomite, lime glass fibers and ceramic fibers. A suitable particle size for organic fillers ranges from about 0.1 to 100 microns, preferably 0.5 to 20 microns. A suitable amount of the inorganic filler is about 0.5% to 20% by weight.

Regarding the $\alpha,\beta$-olefinically unsaturated dicarboxylic acids or anhydrides, maleic anhydride is the preferred acid to react with the modified liquid hydroxy terminated monomers or oligomers of sulfides and polysulfides to form mono, di or polyesters. Fumaric anhydride or itaconic anhydride can be substituted for maleic anhydride if desired. Additionally, succinic anhydride or adipic anhydride can be used in admixture with maleic anhydride with the provisio that at least 10 weight percent of the maleic anhydride comprises the acid mixture.

The ethylenically unsaturated, photocurable compounds useful in carrying out our invention are well known in the art. See, for example, U.S. Pat. Nos. 3,460,105; 2,769,777; 3,389,904; 3,429,795; 3,450,612 and 3,814,702 and German Offen. No. 1,813,001. This ethylenically unsaturated, photocurable compounds can be monomeric or polymeric compounds or mixtures thereof. The term photocurable is used in its conventional sense to describe polymerization and/or crosslinking caused by exposure to ultraviolet light.

Examples of the more common ethylenically unsaturated, photocurable, monomeric compounds useful in the invention are the derivatives of acrylic and methacrylic acid such as esters, amides and nitriles. Examples of such compounds are methyl methacrylate, ethyl methacrylate, 2-ethylhexyl methacrylate, isobutyl methacrylate, butyl acrylate, 2-ethylhexyl acrylate, 2-hydroxyethyl acrylate, 2-methoxyethyl acrylate, 2-hydroxypropylacrylate, ethylene glycol di-acrylate, 1,4-tetramethylene di-methacrylate, trimethylolpropane tri-acrylate, pentaerythritol tetracrylate, alkyl methacrylate, alkyl acrylate, acrylamide, acrylonitrile, and diacetone acrylamide. The ethylenically unsaturated, photocurable compounds also include acrylate capped or acrylate-terminated oligomers such as acrylate capped isocyanates and epoxy resins. Other unsaturated compounds useful in the invention are vinyl acetate, vinyl chloride, vinylidene chloride, styrene, alkylstyrenes, halostyrenes, and divinyl benzenes. Also, included are the compounds of the formula:

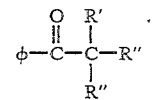

where $\phi$ is phenyl and R', R" and R''' are each independently hydrogen, halo, alkyl, alkoxy or phenyl, with the proviso that R', R" and R''' are not concurrently all hydrogen, all alkyl, or all phenyl. The various alkyl, alkoxy and phenyl groups comprising the molecule may be substituted to a minor extent with substituents which will not interfere with the utility of the compound as a photoinitiator. It is preferred that the alkyl, alkoxy and phenyl groups be unsubstituted. Examples of permissible substituents for the phenyl groups are halo, lower alkyl, lower alkoxy, carboxy and carbanoxy.

When R', R" or R''' is alkyl, it usually contains from 1 to 10 carbon atoms. From 1 to about 6 carbon atoms is typical. From 1 to about 4 carbon atoms is preferred.

When R', R" or R''' is alkyl, it usually contains from 1 to about 6 carbon atoms. From 1 to about 4 carbon atoms is typical. The preferred alkoxy groups are methoxy and isobutoxy.

When R', R" or R''' are halo, it usually is fluoro, chloro or bromo. Chloro is preferred.

Examples of photoinitiators which may be used in the present invention are: Ethyl benzoin ether, isopropopyl benzoin ether, butyl benzoin ether, isobutyl benzoin ether, $\alpha,\alpha$-diethoxyacetophenone, $\alpha,\alpha$-dimethoxy-$\alpha$-phenylacetophenone, diethoxyphenylacetophenone, 4,4'-dicarboethoxybenzoin ethyl ether, benzoin phenyl ether, $\alpha$-methylbenzoin ethyl ether $\alpha$-methylolbenzoin methyl ether, trichloroacetophenone. The preferred photoinitiators are isobutyl benzoin ether and $\alpha,\alpha$-diethoxyacetophenone. Mixtures of photoinitiators may be used, it desired.

Suitable copolymerizable, ethylenically unsaturated, monomeric compounds are acrylate and methacrylate esters, allyl and, preferably, vinyl compounds conventionally used for the preparation of unsaturated polyester adhesives, sealants and coating compositions, for example styrene, substituted sytrenes, e.g. p-chlorostyrene or vinyltoluene, esters of acrylic acid and methacrylic acid and methacrylic acid with alcohols of 1 to 18 carbon atoms, e.g. methyl methylacrylate, butylacrylate, ethylhexyl acrylate, hydroxypropyl acrylate, dihydrodoxyclopentadienyl acrylate and butanediol diacrylate, acrylamides and methacrylamides, allyl esters, e.g. diallyl phthalate, and vinyl esters, e.g. vinyl ethylhexanoate, vinyl divalate and the like. Mixtures of the said olefinically unsaturated monomers are also suitable. Preferred components are styrene, methylstyrene, chlorostyrene, vinyltoluene, divinylbenzene and diallyl phthalate.

Suitable unsaturated vinyl ester resins which can be blended with the polysulfides for the purposes of the invention contain:

as the characteristic group and also contain terminal polymerizable unsaturated groups. The vinyl ester resins are prepared by reacting about equivalent amounts of polyepoxide resin and an unsaturated monocarboxylic acid, for example reacting one equivalent of a polyepoxide resin.

Vinyl ester resins of the stated type are described for example, in U.S. Pat. No. 3,367,992, according to which dicarboxylic acid half-esters of hydroxyacrylates or hydroxymethacrylates are reacted with polypoxide resins. According to U.S. Pat. Nos. 3,066,112 and 3,179,623, vinyl ester resins are obtained from monocarboxylic acids, e.g. acrylic acid and methacrylic acid; these patents also disclose an alternative method of preparation, wherein a glycidyl methacrylate or glycidyl acrylate is reacted with the sodium salt of a dihydric phenol, e.g. bisphenol, e.g. bisphenol A. Vinyl ester resins based on epoxynovlac resins are described in U.S. Pat. No. 3,301,743, U.S. Pat. No. 3,256,226 discloses vinyl ester resins in which the molecular weight of the polyepoxide is increased by reacting it with a dicarboxylic acid e.g. acrylic acid. Modified vinyl ester resins are also suitable for the purposes of the present invention, for example, those disclosed in U.S. Pat. No. 3,947,422, which is herein incorporated by reference.

Hydroxy lower alkyl acrylates and methacrylates are preferred for imparting toughness and strength with flex. For example, an amount as low as 5 weight percent hydroxyethyl methacrylate improves the above characteristics.

The reaction products from the acrylation and methacrylation of the hydroxy terminated sulfide and polysulfide species can be blended with other acrylate and methacrylate esters such as hydroxyethylmethacrylate, 1,4-butanediol dimethacrylate, urethane dimethacrylates, etc. Mono- and diepoxides can also be utilized either alone or as additional constituents to the mixture of polyols. The total mixture can be cured with a peroxide or photocured with a photoinitiator present.

Mixtures of other alcohols including monohydric alcohols, diols, monoepoxides, diepoxides, and polyols with the sulfur containing diols and polyols can also be acrylated or methacrylated at the same time. It is an advantage to acrylate or methacrylate mixtures of the various polyols in order to form a mixed vinyl ester formulation directly. The reaction of these polyols with less than stoichiometric amount of acrylic acid, methacrylic anhydride or acid, etc. leaves some free unreacted hydroxyl groups. This helps promote a less crosslinked rubber and therefore more elastic rubber or polymer. It also helps lower the $T_g$ and provides better sealant properties.

This is a general approach and can advantageously be used on any mixture of alcohols whether sulfur containing or not, to efficiently form a mixture of monofunctional vinyl ester alcohols, divinyl esters, and monovinyl esters. Mono- and diepoxides can also be utilized either alone or as additional constituents to the mixture of polyols. Such mixtures have good elongation and can function as sealants in their own right.

Another way to produce the basic vinyl ester sulfur-backbone resins is by reacting polymercaptan containing compounds such as trimethylolpropane tri(3-mercaptoate), 1,4-butanedithiol, glycol dimercaptoate, etc., with either dithiodiglycol or thiodiglycol or related sulfide and polysulfide containing compounds in the presence of peroxide to form higher molecular weight oligomers and in some cases polysulfide containing compounds with more than two reactive hydroxyls. These new sulfide and polysulfide compounds are then acrylated or methacrylated at the free hydroxyl sites to form new vinyl ester oligomers which can be cured with peroxide or light cured with a photoinitiator. These polymers made this way are very rubbery and soft and make good sealants.

Polymercaptan containing compounds can also be methacrylated or acrylated to form vinyl thioesters which can be polymerized by peroxide or light cure.

The following examples are set forth to illustrate more clearly the principles and practice of this invention to those skilled in the art. Unless otherwise specified where parts of percents are mentioned, they are parts or percents by weight.

Example I

Into a small reaction flask were added 100 g dithiodiglycol and 60 g of succinic acid (or succinic anhydride). (Optionally, a few tenths of a gram of triethylamine and/or hydroquinone were also added.) The mixture was heated and stirred up to 180°–200° F. and then 60 g of methacrylic anhydride (or acid) were added. The mixture was then heated to 220° F. and then permitted to cool with stirring. This resin system could be cured with a peroxide system such as MEK peroxide or with UVa photoinitiator (0.8% Palatal X999-BASF). Test bars were prepared from the various runs using UV light curing.

Examples II

Into a small resin kettle were added 100 g thiodiglycol and 60 g of dithiodipropionic acid. The flask was heated to 180° F. and then 60 g methacrylic anhydride were added and the temperature raised to 220° F. and the resin cooled. The resin was cured with a UV photoinitiator (Palatal X999).

Any dicarboxylic acid or polycarboxylic and or anhydride may be used to extend to make a longer average oligomer from the sulfur containing diol. For example, a mixture of diacrylated diols are diacrylated and monoacrylated. The diols formed may contain no, one, or two molecules of dicarboxylic acid with the oligomer extended accordingly. In the preparation of these resin systems, it was more convenient to make a mixture of products but the pure components could be isolated and then subsequently mixed with modifiers to achieve the best extendable polysulfide sealant for a given application. Diisocyanates and polyisocyanates may also be used at the point to produce oligemeric sulfur containing diols.

The subsequent addition of the acrylating agent whether an acrylic/methacrylic anhydride or an acid reacts with the free hydroxyl groups. In order to maintain high elongation, over 25% and up to 130%, less than stoichiometric amounts of the acrylic acid or anhydride is added. Stoichiometric amounts give highly crosslinked brittle cured resins. If too high a temperature is used for the resin formation reaction the properties would start to degrade.

Example III

Following the procedure of Example I, a series of runs were performed utilizing dithiodiglycol (DTDG), methacrylic acid (MAA), dithiodipropionic acid (DTDPA), 1,6-hexanediisocyanate (1,6-HDI), succinic acid and adipic acid. The results are shown in Table 1.

TABLE 1

| Run No. | DTDG grams | MAA grams | Additive | grams | Peak Temp degrees F | Tensile PSI | Elongation % |
|---|---|---|---|---|---|---|---|
| 1 | 120 | 72 | none | | 220 | 694 | 54% |
| 2 | 120 | 80 | none | | 250 | 2060 | 46% |
| 3 | 120 | 60 | none | | 240 | 408 | 65% |
| 4 | 120 | 64 | none | | 240 | 760 | 69% |
| 5 | 120 | 60 | DTDPA | 9.6 g | 240 | 432 | 71% |
| 6 | 120 | 64 | DTDPA | 9.6 g | 240 | 288 | 73% |
| 7 | 120 | 72 | Adipic | 9.6 g | 240 | 375 | 79% |
| 8 | 120 | 64 | DTDPA | 6 g | 240 | 178 | 108% |
| 9 | 120 | 64 | DTDPA | 6 g | 240 | 169 | 113% |
| 10 | 120 | 72 | Succinic | 9.6 g | 240 | 255 | 130% |
| 11 | 120 | 72 | Succinic | 9.6 g | 255 | 318 | 111% |
| 12 | 120 | 72 | Succinic | 9.6 g | 258 | 655 | 87% |
| 13 | 120 | 76 | DTDPA | 9.6 g | 250 | 369 | 82% |
| 14 | 120 | 76 | Succinic | 9.6 g | 250 | 323 | 69% |
| 15 | 120 | 64 | Succinic | 9.6 g | 250 | 81.6 | 87% |
| 16 | 120 | 64 | DTDPA | 9.6 g | 250 | 214 | 81% |
| 17 | 120 | 76 | DTDPA | 9.6 g | 260 | 715 | 102% |
| 18 | 120 | 76 | DTDPA | 12 g | 260 | 569 | 82% |
| 19 | 120 | 64 | DTDPA | 12 g | 260 | 207 | 79% |
| 20 | 120 | 76 | DTDPA | 12 g | 270 | 464 | 75% |
| 21 | 120 | 72 | DTDPA | 17 g | 245 | 299 | 112% |
| 22 | 120 | 72 | DTDPA | 9.6 g | 230 | 342 | 56% |
| 23 | 120 | 72 | Succinic | 9.6 g | 220 | 412 | 137% |
| 24 | 120 | 72 | Succinic | 9.6 g | 235 | 428 | 120% |
| 25 | 120 | 72 | Succinic | 9.6 g | 250 | 470 | 97% |
| 26 | 120 | 72 | DTDPA | 9.6 g | 220 | 198 | 106% |
| 27 | 120 | 72 | DTDPA | 9.6 g | 235 | 371 | 97% |
| 28 | 120 | 72 | DTDPA | 9.6 g | 250 | 377 | 78% |
| 29 | 120 | 80 | Succinic | 9.6 g | 220 | 951 | 110% |
| 30 | 120 | 72 | 1,6 HDI | 6 g | 235 | 961 | 98% |

What is claimed:

1. A photocurable modified liquid sulfide or polysulfide polymer composition comprising a) a curing initiator consisting of a photoinitiator or a peroxide curing agent; and b) the reaction product of a hydroxy terminated sulfide or polysulfide oligomer having the formula:

HO—CH$_2$—CH$_2$—[S—(S)$_x$—CH$_2$CH$_2$]$_y$—OH

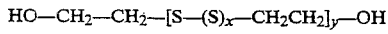

wherein $x=0$ to 1, $y=1$ to 100 and having a molecular weight from 1000 to 8000 with a photocurable ethylenically unsaturated compound in stoichiometric ratios from 0.3 to about 1.1 per hydroxyl group.

2. The composition of claim 1 wherein said ethylenically unsaturated compound is a di-or polyvalent carboxylic acid or an anhydride thereof.

3. The composition of claim 2 wherein the ethylenically unsaturated compound is selected from the group consisting of maleic acid, fumaric acid, itaconic acid and anhydrides thereof.

4. The composition of claim 2 including up to a stoichiometric amount of a polyvalent saturated carboxylic acid.

5. The composition of claim 4 wherein said saturated acid is succinic or adipic acid.

6. The composition of claim 1 cured by a free radical curing initiator.

7. The composition of claim 6 where said free radical curing initiator is activated by actinic light.

8. The composition of claim 7 containing a photocuring initiator.

9. The composition of claim 7 wherein said actinic light is selected from visible light and ultraviolet light.

10. The composition of claim 1 comprising at least one photocurable olefinic compound and a photocuring initiator.

11. The composition of claim 10 wherein said photocurable olefinic compound is selected from acrylic esters, methacrylic esters, vinyl esters or mixtures thereof.

12. The compositions of claim 11 wherein said acrylic ester is selected from hydroxy lower alkyl acrylate.

13. The composition of claim 10 wherein said acrylic ester is hydroxyethyl methacrylate.

14. The composition of claim 1 blended with a member selected from the group consisting of hydroxyethylmethacrylate, 1,4-butanediol dimethacrylate and urethane dimethacrylate.

15. The composition of claim 14 which is cured.

16. A sealant comprising the composition of claim 1.

17. A sealant comprising the composition of claim 15.

* * * * *